US008986769B2

(12) United States Patent
Gonzalez et al.

(10) Patent No.: US 8,986,769 B2
(45) Date of Patent: Mar. 24, 2015

(54) METHODS FOR PRESERVING ENDOGENOUS TGF-β

(75) Inventors: Juan M. Gonzalez, Newburgh, IN (US); Dattatreya Banavara, Newburgh, IN (US); John D. Alvey, Evansville, IN (US)

(73) Assignee: Mead Johnson Nutrition Company, Glenview, IL (US)

( * ) Notice: Subject to any disclaimer, the term of this patent is extended or adjusted under 35 U.S.C. 154(b) by 1174 days.

(21) Appl. No.: 12/370,374

(22) Filed: Feb. 12, 2009

(65) Prior Publication Data

US 2010/0104727 A1  Apr. 29, 2010

Related U.S. Application Data

(60) Provisional application No. 61/108,264, filed on Oct. 24, 2008.

(51) Int. Cl.
  A23C 9/16    (2006.01)
  A23L 1/305   (2006.01)
  A23L 1/29    (2006.01)

(52) U.S. Cl.
  CPC .............. A23L 1/3056 (2013.01); A23L 1/296 (2013.01); A23V 2002/00 (2013.01); A23V 2300/46 (2013.01)
  USPC .......................................... 426/588; 426/580

(58) Field of Classification Search
  CPC ............ A23C 3/02; A23C 3/04; A23C 3/037; A23C 21/00; A23C 2210/00; A23C 2210/15; A23J 3/08; A23V 2002/00
  See application file for complete search history.

(56) References Cited

U.S. PATENT DOCUMENTS

| | | | |
|---|---|---|---|
| 4,840,814 A | | 6/1989 | Harada et al. |
| 4,859,488 A | | 8/1989 | Kan et al. |
| 4,888,194 A | * | 12/1989 | Andersen et al. ............. 426/570 |
| 4,906,482 A | | 3/1990 | Zemel et al. |
| 5,290,571 A | | 3/1994 | Bounous et al. |
| 5,374,567 A | | 12/1994 | Cartagena |
| 5,397,589 A | | 3/1995 | Korte et al. |
| 5,397,591 A | | 3/1995 | Kyle et al. |
| 5,437,880 A | | 8/1995 | Takaichi et al. |
| 5,451,412 A | | 9/1995 | Bounous et al. |
| 5,461,033 A | | 10/1995 | Donnet et al. |
| 5,550,156 A | | 8/1996 | Kyle |
| 5,681,600 A | | 10/1997 | Antinone et al. |
| 5,800,830 A | | 9/1998 | Asano et al. |
| 5,840,361 A | | 11/1998 | Theuer et al. |
| 5,866,418 A | | 2/1999 | Ballard et al. |
| 5,942,274 A | | 8/1999 | Slattery |
| 5,952,295 A | | 9/1999 | Arnaud-Battandier et al. |
| 5,955,136 A | | 9/1999 | Laaman et al. |
| 6,057,430 A | | 5/2000 | Cerletti |
| 6,194,208 B1 | | 2/2001 | Belford et al. |
| 6,319,522 B1 | | 11/2001 | Ballard et al. |
| 6,447,808 B2 | | 9/2002 | Ballard et al. |
| 6,458,402 B1 | * | 10/2002 | Chang ............................ 426/569 |
| 6,497,913 B1 | * | 12/2002 | Gray et al. ..................... 426/565 |
| 6,706,287 B2 | | 3/2004 | Ranganathan et al. |
| 6,733,770 B1 | | 5/2004 | Garcia-Rodenas et al. |
| 6,838,113 B1 | | 1/2005 | Buchanen et al. |
| 6,841,149 B1 | | 1/2005 | Spangler et al. |
| 7,057,016 B2 | | 6/2006 | Cerletti |
| 7,094,550 B2 | | 8/2006 | Grainger et al. |
| 7,141,262 B2 | | 11/2006 | Maubois et al. |
| 2002/0127211 A1 | | 9/2002 | Brassart et al. |
| 2003/0040492 A1 | | 2/2003 | Haschke et al. |
| 2003/0060445 A1 | | 3/2003 | Wilson |
| 2003/0072865 A1 | | 4/2003 | Bindels et al. |
| 2003/0113408 A1 | | 6/2003 | Clark et al. |
| 2003/0129278 A1 | | 7/2003 | Stahl et al. |
| 2003/0157146 A1 | | 8/2003 | Rautonen et al. |
| 2003/0232057 A1 | | 12/2003 | Turini et al. |

(Continued)

FOREIGN PATENT DOCUMENTS

| | | |
|---|---|---|
| EP | 0313515 | 3/1992 |
| EP | 0339656 | 11/1994 |

(Continued)

OTHER PUBLICATIONS

GEA Niro. 2009. GEA Niro Method No. A 21 a-Whey Protein Nitrogen Index [online], [retrieved online on Sep. 16, 2011]. Retrieved from <URL: http://www.niro.com/niro/CMSDoc.nsf/webdocprint/webb7cegzh>; 5 pages.*

Article online by Dairy Foods Magazine, Oct. 2003 by Donna Brooks entitled "Polydextrose For Adding Fiber." Online at http://www.dairyfoods.com.

Article by Chinese Medical Journal, 2004, vol. 117 No. 6, pp. 927-931 by X. Ben et al. entitled "Supplementation of milk formula with galacto-oligosaccharides improves intestinal micro-flora and fermentation in term infants." Online at http//www.cmj.org/information/full.asp?id=1655.

(Continued)

Primary Examiner — Carlos Azpuru
Assistant Examiner — David Bowe
(74) Attorney, Agent, or Firm — Patterson Intellectual Property Law, P.C.; James R. Cartiglia; Bethany J. Whelan

(57) ABSTRACT

The present invention is directed to a processing method and a selection of ingredients that will retain TGF-β levels, bioactivity, and/or bioavailability in a liquid nutritional product. The method involves selecting one or more protein ingredients that have been subjected to a heat load comprising medium-heat or less; combining the protein ingredients with other components of the liquid nutritional product to form a slurry; subjecting the slurry to a pressure of from about 2500 psi to about 3500 psi at a temperature of from about 55° C. to about 65° C. for about 5 to 20 seconds; subjecting the slurry to a temperature of about 135 to 150° C. for about 1.5 to 15 seconds; and cooling the slurry to a temperature of less than about 8° C. over about 30 minutes or less.

9 Claims, 2 Drawing Sheets

(56) References Cited

U.S. PATENT DOCUMENTS

| | | | |
|---|---|---|---|
| 2004/0062758 | A1 | 4/2004 | Mayra-Makinen et al. |
| 2004/0071824 | A1 | 4/2004 | Van Laere et al. |
| 2004/0072794 | A1 | 4/2004 | Kaup et al. |
| 2004/0077539 | A1 | 4/2004 | Maase |
| 2004/0101597 | A1 | 5/2004 | Calapini et al. |
| 2004/0102377 | A1 | 5/2004 | Perrin et al. |
| 2004/0121042 | A1 | 6/2004 | Kudo et al. |
| 2004/0161422 | A1 | 8/2004 | Ranganathan |
| 2004/0191234 | A1 | 9/2004 | Haschke et al. |
| 2004/0191295 | A1 | 9/2004 | Locniskar et al. |
| 2004/0219157 | A1 | 11/2004 | Rochat et al. |
| 2005/0158425 | A1 | 7/2005 | Bouman et al. |
| 2005/0250697 | A1 | 11/2005 | Maubois et al. |
| 2007/0207132 | A1 | 9/2007 | Speelmans et al. |

FOREIGN PATENT DOCUMENTS

| | | |
|---|---|---|
| EP | 0374390 | 6/1995 |
| EP | 0527283 | 11/1997 |
| EP | 0852913 | 7/1998 |
| EP | 0759029 | 7/1999 |
| EP | 1034704 | 9/2000 |
| EP | 1161152 | 10/2004 |
| EP | 0545946 | 1/2005 |
| EP | 1218410 | 6/2005 |
| EP | 1345624 | 6/2006 |
| EP | 1779863 | 5/2007 |
| WO | 9200994 | 1/1992 |
| WO | 0054603 | 9/2000 |
| WO | 0125276 | 4/2001 |
| WO | 02051437 | 7/2002 |
| WO | 02083164 | 10/2002 |
| WO | 2005039318 | 5/2005 |
| WO | 2005039319 | 5/2005 |
| WO | 2005039597 | 5/2005 |

OTHER PUBLICATIONS

Article online by PDR health by S. Suphalac et al. entitled "Lactulose" pp. 1-5. Online at http//www.gettingwell.com/drug_info/nmdrugprofiles/ nutsuppdrugs/lac_0300.shtml.

Article by Current Pharmaceutical Design, 2005, vol. 11, pp. 55-74 by M.J. Kullen et al. entitled "The Delivery of Probiotics and Prebiotics to Infants."

Article by Early Human Development, 2001, vol. 65 Suppl., pp. 43-52 by M. Rivero-Urgell et al. entitled "Olgiosaccharides: application in infant food."

Article by American Journal Clinical Nutrition, 2001, vol. 73 Suppl., pp. 444-450 by E. Isolauri et al. entitled "Probiotics: effects on immunity1-3."

Article by American Journal Clinical Nutrition, 2001, vol. 73 Suppl., pp. 415-420 by J. Cummings et al. entitled "Prebiotics digestion and fermentation1-3."

Article by American Society for Nutritional Sciences, Nutritional Immunology-Research Communication, 2003, pp. 153-156, by M. Roller et al. entitled "Prebiotic Inulin Enriched with Oligofructose in Combination with the Probiotic *Lactobacillus rhamnosus* and *Bifidobacterium lactis* Modulates Intestinal Immune Functions in Rats1."

Article from Journal of Medicinal Food, 2005, vol. 8(1), pp. 113-116 by Pylkans et al. entitled "Comparison of Different Fibers for In Vitro Production of short Chain Fatty Acids by Intestinal Microflora."

Article by Applied and Environmental Microbiology, Aug. 2004, vol. 70, No. 8, pp. 4505-4511 by H. Probert et al. entitled "Polydextros, Lactitol, and Fructo-Oligosaccharide Fermentation by Colonic Bacteria in a Three-Stage Continuous Culture System."

Article from Journal of Family Practice, Aug. 2002 by Mark R. Ellis entitled "What is the best therapy for constipation in infants?"—Clinical inquiries: from the Family Practice Inquiries Network. Online at http://www.findarticles.com/p/articles/mi_m0689/is_8_51/ai_90464039/print.

Article from Chinese Medical Journal, 2004, vol. 117 No. 6, pp. 927-931 by Ben Xiao-ming, et al. entitled Supplementation of milk formula with galacto-oligosaccharides improves intestinal microflora and fermentation in term infants. Online at http://www.Cmj.org/Periodical/PaperList.asp?id=LW8945.

Article from Am J Clin Nutr, 2000, vol. 72 pp. 1503-1509 by Zhong Jie, et al. entitled Studies on the effects of polydextrose intake on physiologic functions in Chinese people1-3.

Article from Journal of Pediatric Gastroenterology and Nutrition, May 2001, vol. 32, pp. 534-541 by Tianan Jiang et al. entitled "Gas Production by Feces of Infants."

Article from Journal of Pediatric Gastroenterology and Nutrition, Nov. 2004, vol. 39, pp. 465-473 by Carlo Agostoni, et al. entitled "Prebiotic Oligosaccharides in Dietetic Products for Infants: A Commentary" by the ESPGHAN Committee on Nutrition.

Article by Nutrition, 2002, vol. 18, pp. 484-489 by Pedro A. Alarcon et al. entitled "Gastrointestinal Tolerance of a New Infant Milk Formula in Healthy Babies: An International Study Conducted in 17 Countries."

Article from J. Clin Gastroenteroal, Jul. 2004, vol. 38, Supp. 2 pp. S76-S79 by G. Boehm et al. entitled "Prebiotic in Infant Formulas."

Article from Acta Paediatrica, 2005, vol. 94 (Suppl. 449), pp. 18-21 by Gunther Boehm et al. entitled "Prebiotic Carbohydrates in Human Milk and Formulas."

Article from Arch. Dis. Child. Fetal Neonatal Ed., 2002, vol. 86, pp. F178-F181 by G. Boehm et al. entitled Supplementation of a bovine milk formula with an oligosaccharide mixture increases counts of faecal bifidobacteria in preterm infants. Online at http://www.bmj-journals.com.

ESPGHAN Abstracts by J. Pediatr Gastroenterology Nutr., Apr. 2003, vol. 36(4), No. P179 by G. Boehm et al. entitled Effect of increasing number of intestinal bifidobacteria on the presence of clinically relevant pathogens.

Article from Pediatrics, May 1993, vol. 91, No. 5, pp. 908-914 by Christi K. Bradley et al. entitled "Evaluation of Two Iron-Fortified, Milk-Based Formulas During Infancy."

Article from Pediatric Research, 2006, vol. 59, No. 3, pp. 451-456 by Oscar Brunser et al. entitled "Effect of Milk Formula with Prebiotics on the Intestinal Microbiota of Infants After an Antibiotic Treatment."

Article from Journal of Pediatric Gastroenterology and Nutrition, 2000, vol. 30, pp. 181-192 by Renee M. Erney et al. entitled "Variability of Human Milk Neutral Oligosaccharides in a Diverse Population."

Article from Acta Paediatr, 2003, Supp. 441, pp. 48-55 by S. Fanaro et al. entitled "Intestinal Microflora in Early Infancy: Composition and Development."

Article from Journal of Pediatric Gastroenterology and Nutrition, Aug. 2005, vol. 41, pp. 186-190 by S. Fanaro et al. entitled "Acidic Oligosaccharides from Pectin Hydrolysate as New Component for Infant Formulai: Effect on Intestinal Flora, Stool Characteristics, and pH."

Article from J. Nutr., 1999, vol. 129, pp. 1438S-1441S by Glenn R. Gibson entitled "Dietary Modulation of the Human Gut Microflora Using the Prebiotics Oligofructose and Inulin."

Article from J. Nutr., 1995, vol. 125, pp. 1401-1412 by Glenn R. Gibson et al. entitled "Dietary Modulation of the Human Colonic Microbiota: Introducing the Concept of Prebiotics."

Article fromPediatrics, 1995, vol. 95, pp. 50-54 by Jeffrey S. Hyam et al. entitled "Effect of Infant Formula on Stool Characteristics of Young Infants."

Article from Journal of Pediatric Gastroenterology and Nutrition, Mar. 2003, vol. 36, pp. 301-310 by Lawrence T. Weaver entitled "Improving Infant Milk Formulas: Near the End of the Trail for the Holy Grail?"

Article from Microbiol. Immunol., 1984, vol. 28, No. 9, pp. 975-986 by Yoshimi Benno et al. entitled "The Intestinal Microflora of Infants: Composition of Fecal Flora in Breast-Fed and Bottle-Fed Infants."

ESPGHAN Abstracts from Journal of Pediatric Gastroenterology and Nutrition, Apr. 2002, vol. 34(4), p. 477, No. 2 by Knol et al. entitled "Bifidobacterial species that are present in breast fed infants are stimulated in formula fed infants by changing to a formula containing prebiotics."

(56) References Cited

OTHER PUBLICATIONS

Article from Lipids, 1991, vol. 26, pp. 250-253 by R.J. Jandacek entitled "The Solubilization of Calcium Soaps by Fatty Acids."

Article from Journal Clinical Microbiology, Feb. 1987, pp. 285-289 by Elisabeth A.E. Mevisen, et al. entitled "Bifidobacterium, Bacteroides, and *Clostridium* spp. In Fecal Samples from Breast-Fed and Bottle-Fed Infants with and without Iron Supplement."

A book entitled Handbook of Milk Composition (1995) published by Academic Press, San Diego, Chapter 4, pp. 273-349, by David S. Newburg et al. entitled "Carbohydrates in Milks Analysis, Quantities and Significance."

Article by The EFSA Journal, 2004, vol. 31, pp. 1-11 entitled "Opinion of the Scientific Panel on Dietetic Products, Nutrition and Allergies on a request from the Commission relating to the safety and suitability for particular nutritional use by infants of fructooligosaccharides in infant formulae and follow-on formulae."

Article by Am J Clin Nutr, 1999, vol. 70, pp. 920-927 by Kathy Kennedy et al. entitled "Double-blind, randomized trial of synthetic triacylglycerol in formula-fed term infants: effects on stool biochemistry, stool characteristics, and bone mineralization1-3."

ESPR Abstracts from J. Pediatr Gastroenterol Nutr., 2005, p. 487, Abstract No. 134 by C. van Limpt et al. entitled "Effect of Colonic Short Chain Fatty Acids, Lactate and pH on the Growth of Common Gut Pathogens."

Article by Pediatrics, Jan. 1999, vol. 103, No. 1, pp. 1-6 by Beate Lloyd et al. entitled "Formula Tolerance in Postbreastfed and Exclusively Formula-fed Infants."

Article by Acta Paediatr Scand., 1985, vol. 74, pp. 45-51 by B. Lundequest, et al. entitled "The Composition of the Faecal Microflora in Breastfed and Bottle Fed Infants from Birth to Eight Weeks."

Article by BMJ, 1999, vol. 318, pp. 999-1003 by George T. Macfarlane et al. entitled "Probiotics and prebiotics: can regulating the activities of intestinal bacteria benefit health?"

A review published in Geneva 1994 by Gordon & Breach Science, pp. 90-106, Chapter 5 by Keisuke Matsumoto et al. entitled "Galactooligosaccharides."

Article by Child: Care, Health and Development, 1997, vol. 23, No. 6, pp. 475-478 by R. Morley et al. entitled Infant Feeding and maternal concerns about stool harness.

Article by Acta Paediatr, 2003, Suppl. 441, pp. 77-79 by GE Moro, et al. entitled "Effects of a new mixture of prebiotics on faecal flora and stools in term infants."

Article by Acta Paediatrica, 2005, vol. 94, Suppl. 449, pp. 27-30 by Guido Moro et al. entitled Dietary prebiotic oligosaccharides are detectable in the faeces of formula-fed infants.

Article by Acta Paediatr, 1999, Suppl. 430, pp. 47-57 by K. Orrhage et al. entitled "Factors controlling the bacterial colonization of the intestine in breastfed infants."

Article by Journal of Pediatric Gastroenterology and Nutrition, 1995, vol. 20, pp. 81-90 by P.T. Quinlan et al. entitled "The Relationship between Stool Hardness and Stool Composition in Breast and Formula-Fed Infants."

Article from Immunology and Medical Microbiology, 2005, vol. 43, pp. 59-65 by Minna M. Rinne et al. entitled "Similar bifidogenic effects of prebiotic-supplemented partially hydrolyzed infant formula and breastfeeding on infant gut microbiota."

Article by Eur J. Nutr, 2002, vol. 41, pp. 85-92 by Silvia Rudloff et al. entitled "Detection of ligands for selectins in the oligosaccharide fraction of human milk."

Article by Am J Clin Nutr, 2001, vol. 73 (Suppl.), pp. 459S-464S by Katharina E. Scholz-Ahrens et al. entitled "Effects of prebiotics on mineral metabolism."

Abstract from PubMed by Indian J. Matern Child Health, 1993, vol. 4, No. 2, pp. 62-63 by K. Singh et al. entitled "Mothers' concept of the ideal number, colour and consistency of stools of their infants." Online at http://www.ncbi.nlm.nig.gov/entrez/query.fcgi?CMD=search&DB=pubmed.

Article by British Journal of Nutrition, 1999, vol. 81, pp. 121-132 by Jan Van Loo et al. entitled "Functional food properties of non-digestible oligosaccharides: a consensus report from the ENDO project (DGXII AIRII-CT94-1095)."

Article from J Nutr, 1979, vol. 109, pp. 1682-1687 by Fred H. Mattson et al. entitled "The absorbability by Rats of Various Triglycerides of Stearic and Oleic Acid and the Effect of Dietary Calcium and Magnesium." Online at http://jn.nutrition.org/cgi/content/abstract/109110/1682.

Oldfield, D.J., et al., "Effect of preheating and other process parameters on whey protein reactions during skim milk powder manufacture," International Dairy Journal 15 (2005) 501-511.

\* cited by examiner

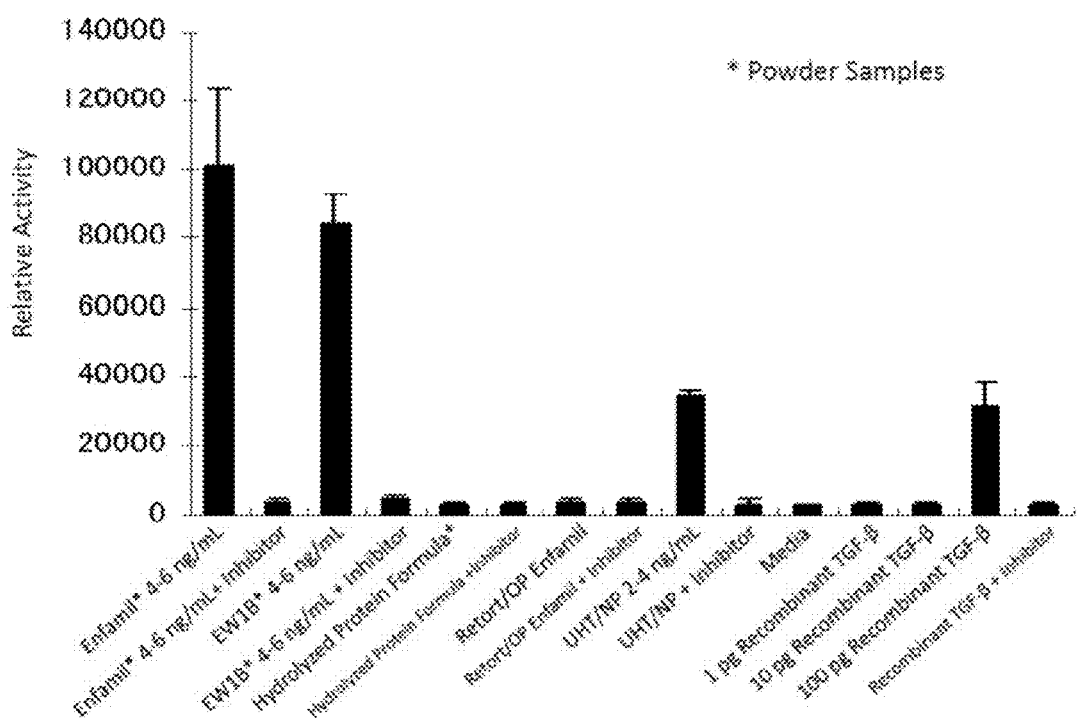
Figure 2. *In-vitro* bioassay

METHODS FOR PRESERVING ENDOGENOUS TGF-β

CROSS-REFERENCES TO RELATED APPLICATIONS

This application claims benefit of the following patent application(s) which is/are hereby incorporated by reference: U.S. Provisional Application Ser. No. 61/108,264 filed Oct. 24, 2008.

BACKGROUND OF THE INVENTION

Field of the Invention

The present invention relates generally to methods of preserving the bioactivity of transforming growth factor-β (TGF-β) in liquid nutritional products.

SUMMARY OF THE INVENTION

Briefly, the present invention is directed, in an embodiment, to a method of preparing a liquid nutritional product that retains the bioactivity of TGF-β. The steps involve selecting one or more protein ingredients that have been subjected to a heat load comprising medium-heat or less; combining the protein ingredients with all other components of the liquid nutritional product to form a slurry; subjecting the slurry to a pressure of from about 2500 per square inch (psi) to about 3500 psi at a temperature of from about 55° C. to about 65° C. for about 5 to about 20 seconds; subjecting the slurry to a temperature of from about 135° C. to about 150° C. for about 1.5 to about 15 seconds; and cooling the slurry to a temperature of less than about 8° C. over about 30 minutes or less.

BRIEF DESCRIPTION OF THE DRAWINGS

A full and enabling disclosure of the present invention, including the best mode thereof directed to one of ordinary skill in the art, is set forth in the specification, which refers to the appended figures, in which:

FIG. 2 is a bar chart illustrating the bioactivity of infant formula produced according to the new process versus infant formula produced according to the standard process.

DETAILED DESCRIPTION OF THE PREFERRED EMBODIMENTS

Figure 1:
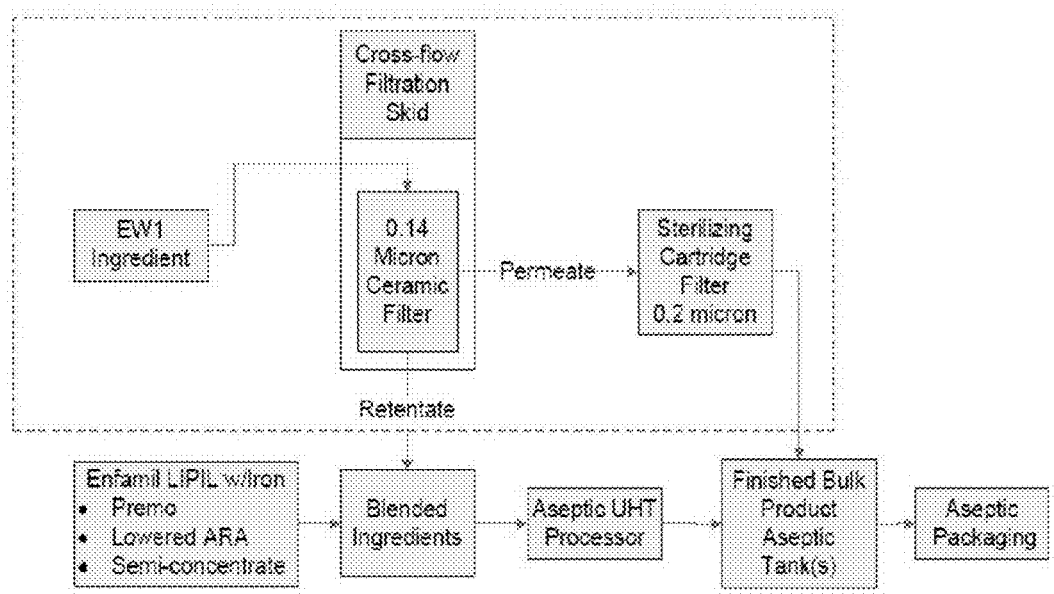
FIG. 1 illustrates an embodiment of a method of the present invention.

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment.

Thus, it is intended that the present invention covers such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

As set forth above, the present invention relates generally to methods of preserving the bioactivity of TGF-β in liquid nutritional products. References related to such methods may include U.S. Pat. Nos. 7,057,016 or 6,057,430 to Cerletti.

Transforming growth factor-beta (TGF-β) is the general name for a family of polypeptides, the members of which have multifunctional regulatory activities. Three differentially regulated mammalian isoforms (termed TGF-β1, TGF-β2, and TGF-β3) play important roles in a multitude of processes in the developing embryo, infant, child and adult. TGF-β is a 25-kDa homodimeric cytokine known to mediate pleitropic functions both within the immune system and systemically. TGF-β is expressed in several cell types in the intestinal mucosal including lymphocytes, epithelial cells, macrophages, and stromal cells as well as by T-cells, neutrophils, macrophages, epithelial cells, fibroblasts, platelets, osteoblasts, osteoclasts and others. In addition, TGF-β is present in human breast milk and may influence multiple aspects of infant health and development.

TGF-βs are synthesized as large precursor proteins which consist of an amino-terminal pro-domain, comprising a signal sequence and latency-associated complex, and a mature carboxy-terminal subunit. Biologically active TGF-βs are homodimers which consist of two identical, disulfide-linked mature subunits. Release of the TGF-β homodimer from the latency-associated complex is necessary for TGF-β to exert biological activity on target cells. The nature of the latency-associated complex and the mechanisms responsible for TGF-β release are key to understanding TGF-β biological activity in vivo. In the human gut, this may be accomplished by the action of proteolytic enzymes, pH extremes, heat, calcium, and/or mechanical tearing.

Based on the numerous benefits provided by TGF-β, it is often important that the growth factor is present in, or supplemented into, various liquid nutritional products. For example, certain protein sources in nutritional products may provide a source of TGF-β. Alternatively, if the nutritional product itself does not contain TGF-β, the growth factor may be supplemented into the product. In either case, however, it is difficult to retain the biological activity of the TGF-β through the manufacturing process for a liquid nutritional product.

Shelf stable, non-refrigerated liquid nutritional products are typically processed using a high heat treatment to destroy pathogenic bacterial spores. A common retort process might heat the product to 130° C. for 2.5 minutes, depending upon the solids content of the nutritional product. Alternatively, Ultra High Temperature (UHT) could be used. UHT heats the product to temperatures in the range of 135-150° C. for 1.5 to 15 seconds. TGF-β, a heat-labile bioactive compound, often cannot survive the common retort process required for manufacturing shelf-stable liquid nutritional products. These processes often significantly denature the native structure of TGF-β, thereby rendering it physiologically inert and unable to be activated in the human gut.

Thus, the technical problem to be solved by the present invention is to provide methods for preparing liquid nutritional products such that TGF-β and other heat-labile components retain their bioactivity and availability. In an embodiment, the present invention is directed to a processing method and a selection of ingredients that will retain TGF-β levels, bioactivity, and/or bioavailability in a shelf-stable, non-refrigerated, dairy-based liquid nutritional product.

Prior to arrival at any processing plant, the manufacture of dairy-based raw materials, such as non-fat dry milk (also known as skim milk powder), whey protein powders, condensed milk, caseins, and others, requires some level or heating to ensure safety. According to the invention, dairy-based raw materials are classified based on the cumulative heat treatments that they have received, as shown in Tables 1 and 2. Because it is difficult to determine the type of heat treatment the raw material has received upon inspection, the undenatured whey protein nitrogen (WPN) levels of the raw material are measured to convey such information. Table 1 indicates the generally-accepted treatment parameters and WPN levels for non-fat dry milk.

TABLE 1

Approximate temperatures, times, and WPN levels for non-fat dry milk

| | Low-Heat | Medium-Heat | High-Heat |
| --- | --- | --- | --- |
| Cumulative Heat Treatment Temp | 70° C. | 70° C.-78° C. | 88° C. |
| Cumulative Heat Treatment Time | 2 mins | 20 mins | 30 mins |
| Undenatured Whey Protein Nitrogen Levels | 6 mg/g or greater | 1.5 mg-5.99 mg/g | 1.5 mg/g or less |

The level of WPN in non-fat dry milk is the amount of undenatured whey protein present in the non-fat dry milk expressed in milligrams nitrogen per gram non-fat dry milk. In a particular embodiment, to determine the WPN level of a non-fat dry milk, the milk powder may be rehydrated, heated in a saturated sodium chloride solution, and filtered. The filtrate then contains the undenatured whey proteins and the non-protein nitrogen fractions. The filtrate may then be diluted in a saturated salt solution and acidified, and the solution may be measured spectrophometrically. The transmittance obtained may then be compared to a standard curve that plots the Kjeldahl nitrogen values from standards against transmittance for those standards. This method is often referred to as the Harland-Ashworth Test. In other embodiments, any method known in the art for determining WPN levels in non-fat dry milk may be used.

Thus, as used herein, a "low-heat" non-fat dry milk is defined as one that contains at least about 6 mg/g WPN upon arrival for processing. Low-heat non-fat dry milk has likely experienced exposure to a temperature of less than about 70° C. for approximately 30 seconds to 5 minutes.

A "medium-heat" non-fat dry milk is defined as one that contains between about 1.51 mg/g and about 5.99 mg/g WPN upon arrival for processing. Medium-heat non-fat dry milk has likely experienced exposure to a temperature in the range of about 70° C. to 78° C. for approximately 15 to 25 minutes.

As used herein, a "high-heat" non-fat dry milk is defined as one that contains about 1.5 mg/g or less of WPN upon arrival for processing. High-heat non-fat dry milk has likely experienced exposure to a temperature of at least 88° C. for 30 minutes or more.

Table 2 indicates the treatment parameters and WPN levels for whey protein powders, including whey protein concentrate and whey protein isolate. See Mahmoud, et al., *Factors Affecting Measurement of Undenatured Whey Protein Nitrogen in Dried Whey by a Modified Harland-Ashworth Test*, J. Dairy Sci. 73:1694-1699 (1990).

TABLE 2

Approximate temperatures, times, and WPN levels for whey protein powder

| | Low-Heat | Medium-Heat | High-Heat |
| --- | --- | --- | --- |
| Cumulative Heat Treatment Temp | 63° C. | 70° C.-78° C. | 91° C. |
| Cumulative Heat Treatment Time | 30 mins | 20 mins | 30 mins |
| Undenatured Whey Protein Nitrogen Levels | 14.5 mg/g or greater | 5.99 mg-14.49 mg/g | 6.0 mg/g or less |

The WPN levels in whey protein powders are higher than those of standard non-fat dry milk because the whey protein composition in whey protein powder, such as whey protein concentrate, which is about 50% protein, is at least 6 to 7 times higher than in nonfat dry milk on a dry basis. As the method detects denaturation in whey protein, results of whey protein powders are expected to be higher than results obtained with non-fat dry milk.

Thus, as used herein, a "low-heat" whey protein powder is defined as one that contains at least about 14.5 mg/g WPN upon arrival for processing. Low-heat whey protein powder has likely experienced exposure to a temperature of less than about 63° C. for approximately 30 seconds to 30 minutes.

A "medium-heat" whey protein powder is defined as one that contains between about 5.99 mg/g and about 14.49 mg/g WPN upon arrival for processing. Medium-heat whey protein powder has likely experienced exposure to a temperature in the range of about 70° C. to 78° C. for approximately 15 to 25 minutes.

As used herein, a "high-heat" whey protein powder is defined as one that contains about 6.0 mg/g or less of WPN upon arrival for processing. High-heat whey protein powder has likely experienced exposure to a temperature of at least 91° C. for 30 minutes or more.

The selection of ingredients according to the invention is important because the levels of heat treatment impact the physicochemical properties of a protein source as well as its value in the processing of foods. The heat-induced denaturation of whey proteins causes them to interact with the surface of casein micelles. This denaturation provides higher heat stability to milk casein during liquid formula manufacture. However, this process also denatures a number of bioactive components present in milk, such as growth factors like TGF-β.

In an embodiment of the present invention, the method comprises the particular selection of the protein material according to the heat load received during its manufacture and the thermal processes applied to the nutritional product during processing.

In an embodiment, the selection of protein materials for the nutritional product includes a source of non-fat dry milk. In this embodiment, the non-fat dry milk source may have a WPN of greater than about 1.5 mg/g. In another embodiment, the non-fat dry milk source may have a WPN of greater than about 2.0 mg/g. In yet another embodiment, the non-fat dry milk source may have a WPN of greater than about 3.0 mg/g. In a further embodiment, the non-fat dry milk source may have a WPN of greater than about 4.0 mg/g. In a still further embodiment, the non-fat dry milk source may have a WPN of greater than about 5.0 mg/g. In a particular embodiment, the non-fat dry milk source may have a WPN of greater than about 6.0 mg/g.

In some embodiments, the non-fat dry milk source may have a WPN of from about 3 mg/g to about 10 mg/g. In some embodiments, the non-fat dry milk contains a WPN level of about 1.5 mg/g to about 8 mg/g. In still other embodiments, the non-fat dry milk contains a WPN level of between about 5 mg/g and about 8 mg/g. While the WPN levels are classified herein according to low-, medium-, and high-heat, it is to be understood that a medium-heat non-fat dry milk having a WPN level closer to about 5.99 mg/g than to about 1.5 mg/g may have greater endogenous quantities of TGF-β present therein.

In another embodiment, the selection of protein materials for the nutritional product includes a source of whey protein powder. In this embodiment, the whey protein powder may be selected from the group consisting of sweet whey, demineralized whey, whey protein concentrate, whey protein isolate, and combinations thereof. In each embodiment, the whey protein powder source has received medium-heat, low-heat, or no heat. Thus, in an embodiment, the whey protein powder may have a WPN of greater than about 6.0 mg/g. In another embodiment, the whey protein powder may have a WPN of greater than about 8.0 mg/g. In yet another embodiment, the whey protein powder may have a WPN of greater than about 10.0 mg/g. In a further embodiment, the whey protein powder may have a WPN of greater than about 12.0 mg/g. In a still further embodiment, the whey protein powder may have a WPN of greater than about 14.0 mg/g. In a particular embodiment, the whey protein powder may have a WPN of greater than about 14.5 mg/g.

In some embodiments, the whey protein powder may have a WPN of from about 6 mg/g to about 15 mg/g. In some embodiments, the whey protein powder contains a WPN level of about 10 mg/g to about 20 mg/g. In still other embodiments, whey protein powder contains a WPN level of between about 12 mg/g and about 15 mg/g. While the WPN levels are classified herein according to low-, medium-, and high-heat, it is to be understood that a medium-heat whey protein powder having a WPN level closer to about 14.5 mg/g than to about 6.0 mg/g may have greater endogenous quantities of TGF-β present therein.

In another embodiment, the selection of protein materials for the nutritional product includes a source of casein selected from the group consisting of whole milk powder, milk protein concentrate, milk protein isolate, and combinations thereof. In each embodiment, the casein source has been selected based upon a minimal heat treatment history. By minimizing the amount of heat applied to the protein materials, the TGF-β can be better protected and can survive the UHT process during the product manufacture. The TGF-β in whey materials is more sensitive to heat-denaturation than the TGF-β present in casein-containing ingredients. This is generally attributed to a protective effect that caseins exert over the bioactive component.

In some embodiments, both casein and whey protein sources are utilized in the nutritional product.

Prior to the present invention, one of ordinary skill in the art would not have selected raw materials having the WPN levels claimed herein. The person of ordinary skill in the art believed that the heat processing of a liquid nutritional product would destroy any TGF-β activity of the ingredients. Accordingly, there was no motivation to select a low- or medium-heat raw material. In addition, the selection of high-heat raw materials was actually preferred prior to the present invention due to the fact that denaturation of the proteins via high-heat manufacturing techniques provided a final product which had less foaming than one with undenatured proteins. The inventors have surprisingly discovered that by selecting ingredients having WPN levels as claimed herein and by administering the claimed processing steps, the endogenous TGF-β levels and activity can be retained in the final product.

In an embodiment of the invention, protein ingredients are selected based upon their manufacturing heat treatment and combined with all other components of the liquid nutritional product to form a slurry. In some embodiments, the slurry is first pasteurized. The pasteurization may be conducted at a temperature of about 70° C. to about 75° C. for approximately 5 to 25 seconds. In other embodiments, the pasteurization may be conducted at a temperature of about 72° C. for approximately 10-20 seconds. In still other embodiments, the pasteurization may be conducted at a temperature of about 72° C. for approximately 15 seconds.

This slurry is then homogenized. The homogenization step may be conducted at a pressure of between about 2500 pounds per square inch (psi) and 3500 psi. In other embodiments, the pressure may be about 3000 psi. The temperature range may be from about 55° C. to about 65° C. for the homogenization step. The homogenization step, in an embodiment, may take place for about 5 to 20 seconds. In a particular embodiment, the homogenization step is conducted at a pressure of about 3000 psi and a temperature in the range of about 55° C. to about 65° C. for about 5 to 20 seconds.

The homogenized emulsion is then UHT-treated. In an embodiment, the UHT treatment is conducted at a temperature in the range of about 135° C. to about 150° C. In other embodiments, the UHT treatment is conducted at a temperature in the range of about 141° C. to about 145° C. The UHT treatment may take place for about 1.5 to 15 seconds. In a particular embodiment, the UHT treatment is conducted at a temperature in the range of about 141° C. to about 145° C. for approximately 5 seconds.

The process then involves a rapid cooling step. In this step, the product may be cooled to a temperature of less than about 8° C. The cooling step may occur in less than about 30 minutes.

After the product is cooled, the product may be aseptically filled in the desired format to render a shelf-stable, non-refrigerated dairy product having active levels of TGF-β therein.

In an alternate embodiment of the method, the slurry may be processed using high-pressure processing technology, under a combination of pressure in the range of about 400 MPa to about 600 MPa and a temperature in the range of about of 60° C. to about 80° C. for about 1 to 3 minutes. This high-pressure processed material can then be homogenized and even further UHT treated, if needed, as discussed above. This high-pressure alternate embodiment allows the nutritional product to retain its TGF-β bioactivity. The high-pressure treated material can also be combined with one or all of the above processes to obtain a shelf-stable product which has active TGF-β and other bioactive compounds.

In a particular embodiment, shown in FIG. 1, one or more low- or medium-heat ingredients may be pumped through a cross-flow filtration system, such as a 0.14 micron ceramic filter. These ingredients may comprise liquid whey ingredients, or reconstituted whey protein concentrates, optionally at low pH. The retentate may be intermixed with other ingredients necessary for the nutritional product. The retentate mixture may then be heat processed and transferred to an aseptic bulk product tank. The permeate from the cross-flow filtration step above may be pumped again through another cross-flow filtration system, such as a 0.20 micron spiral-wound membrane filter. The resulting permeate may then be aseptically dosed into the heat-treated product and packaged aseptically to render a shelf stable product.

In some embodiments, the inventive process is used to produce shelf-stable, non-refrigerated liquid products. The process may also be used to produce refrigerated products, however. In an embodiment, the method can be modified in order to supplement the endogenous levels of TGF-β present in the selected raw materials.

In some embodiments, the nutritional product may be an infant formula. As used herein, the term "infant" means a person not more than 12 months of age. The term "infant formula" applies to a composition in liquid or powdered form intended for use, where necessary, as a substitute for human milk (breast milk substitute) in meeting the normal nutritional requirements of infants. In a separate embodiment, the nutritional product may be a human milk fortifier, meaning it is a composition which is added to human milk in order to enhance the nutritional value of human milk. As a human milk fortifier, the inventive composition may be in powder or liquid form. In another embodiment, the inventive nutritional product may be a follow-up formula. The term "follow-up formula" as used herein refers to foods intended for use as a liquid part of the weaning diet for the infant from the $6^{th}$ month of life on and for young children. As used herein, the term "young child" or "young children" means persons from the age of more than 12 months up to the age of three years. In yet another embodiment, the inventive nutritional product may be a children's nutritional composition. The term "child" or "children" as used herein means persons over the age of 3 years and prior to adolescence. In still another embodiment, the inventive nutritional product may be a growing-up milk. The term "growing-up milk" refers to a broad category of milk-based fortified beverages intended to be used as a part of a diverse diet in order to support the normal growth and development of children from the ages of 1 to 6 years.

In some embodiments, the composition is an acidified product. As used herein, the term "acidified product" refers to a nutritional composition which has a finished equilibrium pH of 4.6 or below and a water activity greater than 0.85. In still another embodiment, the nutritional product may be a medical food. The term "medical food" is defined as a food which is formulated to be consumed or administered enterally under the supervision of a physician and which is intended for the specific dietary management of a disease or condition for which distinctive nutritional requirements, based on recognized scientific principles, are established by medical evaluation. In general, to be considered a medical food, a product must, at a minimum, meet the following criteria: the product must be a food for oral or tube feeding; the product must be labeled for the dietary management of a specific medical disorder, disease or condition for which there are distinctive nutritional requirements; and the product must be intended to be used under medical supervision.

The nutritional products of the invention may provide minimal, partial, or total nutritional support. The compositions may be nutritional supplements or meal replacements. In some embodiments, the compositions may be administered in conjunction with a food or nutritional composition. In this embodiment, the compositions can either be intermixed with the food or other nutritional compositions prior to ingestion by the subject or can be administered to the subject either before or after ingestion of a food or nutritional composition. The compositions may be administered to preterm infants receiving infant formula, breast milk, a human milk fortifier, or combinations thereof.

The compositions may, but need not, be nutritionally complete. The skilled artisan will recognize "nutritionally complete" to vary depending on a number of factors including, but not limited to, age, clinical condition, and dietary intake of the subject to whom the term is being applied. In general, "nutritionally complete" means that the nutritional composition of the present invention provides adequate amounts of all carbohydrates, lipids, essential fatty acids, proteins, essential amino acids, conditionally essential amino acids, vitamins, minerals, and energy required for normal growth. As applied to nutrients, the term "essential" refers to any nutrient which cannot be synthesized by the body in amounts sufficient for normal growth and to maintain health and which therefore must be supplied by the diet. The term "conditionally essential" as applied to nutrients means that the nutrient must be supplied by the diet under conditions when adequate amounts of the precursor compound is unavailable to the body for endogenous synthesis to occur.

The composition which is "nutritionally complete" for the preterm infant will, by definition, provide qualitatively and quantitatively adequate amounts of all carbohydrates, lipids, essential fatty acids, proteins, essential amino acids, conditionally essential amino acids, vitamins, minerals, and energy required for growth of the preterm infant. The composition which is "nutritionally complete" for the term infant will, by definition, provide qualitatively and quantitatively adequate amounts of all carbohydrates, lipids, essential fatty acids, proteins, essential amino acids, conditionally essential amino acids, vitamins, minerals, and energy required for growth of the term infant. The composition which is "nutritionally complete" for a child will, by definition, provide qualitatively and quantitatively adequate amounts of all carbohydrates, lipids, essential fatty acids, proteins, essential amino acids, conditionally essential amino acids, vitamins, minerals, and energy required for growth of a child.

If the nutritional product is an infant formula or human milk supplement, it may be a product for a full-term infant, a preterm infant, a low-birth-weight infant, a very-low-birth-weight infant, or an extremely low birth weight infant. As used herein, the term "full-term" refers to neonatal infants born after about 37 weeks of gestation through 42 weeks gestation but less than 1 month of age. The term "full-term infant" or "infant" as used herein refers to an infant less than twelve months of age. As used herein, the terms "preterm" or "preterm infant" includes infants born prior to about 37 weeks of gestation. As used herein, the term "low birth weight" or "low birth weight infant" are those infants are those weighing from about 3.3 to about 5.5 pounds at birth. "Very-low-birth-weight infants" are those weighing less than about 3.3 to about 2.2 pounds at birth. "Extremely low birth weight" or "extremely low birth weight infants" are those weighing less than 2.2 pounds at birth.

In certain embodiments, the nutritional product formed via the method of the invention may be administered enterally or parenterally. As used herein, "enteral" means through or within the gastrointestinal, or digestive, tract, and "enteral administration" includes oral feeding, intragastric feeding, transpyloric administration, or any other introduction into the digestive tract. The term "parenterally" means taken into the body or administered in a manner other than through the digestive tract, such as by intravenous or intramuscular injection.

In an embodiment, the amount of lipid or fat in the composition may vary from about 4 to about 7 g/100 kcal. In another embodiment, the amount of fat may vary from about 5 to about 6 g/100 kcal. In a further embodiment, the amount of fat may vary from about 5.3 to about 5.6 g/100 kcal. In yet another embodiment, the amount of fat may vary from about 5.4 to about 5.9 g/100 kcal. In still another embodiment, the amount of fat may vary from about 5.5 to about 5.7 g/100 kcal. Suitable lipid sources for practicing the present invention may be any known or used in the art, including but not limited to, animal sources, e.g., milk fat, butter, butter fat, egg yolk lipid; marine sources, such as fish oils, marine oils, single cell oils; vegetable and plant oils, such as corn oil, canola oil, sunflower oil, soybean oil, palmolein, coconut oil, high oleic sunflower oil, evening primrose oil, rapeseed oil, olive oil, flaxseed (linseed) oil, cottonseed oil, high oleic safflower oil, palm stearin, palm kernel oil, wheat germ oil; medium chain triglyceride oils and emulsions and esters of fatty acids; and any combinations thereof.

In an embodiment of the invention, the amount of protein in the composition may vary from about 1 to about 5 g/100 kcal. In another embodiment, the amount of protein may be from about 1.8 to about 2.5 g/100 kcal. In another embodiment, the amount of protein may be from about 2.0 to about 2.2 g/100 kcal. In one embodiment, the amount of protein may be about 2.1 g/100 kcal. Bovine milk protein sources useful in practicing the present invention include, but are not limited to, milk protein powders, milk protein concentrates, milk protein isolates, nonfat milk solids, nonfat milk, nonfat dry milk, whey protein, whey protein isolates, whey protein concentrates, sweet whey, acid whey, casein, acid casein, caseinate (e.g. sodium caseinate, sodium calcium caseinate, calcium caseinate) and any combinations thereof.

In an embodiment of the invention, the proteins are provided as intact proteins. In other embodiments, the proteins are provided as a combination of both intact proteins and partially hydrolyzed proteins, with a degree of hydrolysis of between about 4% and 10%. In yet another embodiment, the protein source may be supplemented with glutamine-containing peptides.

In a particular embodiment of the invention, the whey:casein ratio is similar to that found in human breast milk. In an embodiment, the protein source comprises from about 40% to about 70% whey protein. In another embodiment, the protein source may comprise from about 30% to about 60% caseins. In one embodiment, the protein source may comprise from about 40% to about 70% whey protein and from about 30% to about 60% caseins.

The amount of carbohydrate in the composition of the invention may, in an embodiment, vary from about 8 to about 12 g/100 kcal. In another embodiment, the amount of carbohydrate may vary from about 10.5 to 11 g/100 kcal. In a particular embodiment, the amount of carbohydrate may be about 10.6 g/100 kcal. Carbohydrate sources may be any known or used in the art, e.g., lactose, fructose, glucose, corn syrup, corn syrup solids, maltodextrins, sucrose, starch, rice syrup solids, rice starch, modified corn starch, modified tapioca starch, rice flour, soy flour, and combinations thereof.

In a particular embodiment, the carbohydrate component may be comprised of 100% lactose. In yet another embodiment, the carbohydrate component comprises between about 0% and 60% lactose. In another embodiment, the carbohydrate component comprises between about 15% and 55% lactose. In yet another embodiment, the carbohydrate component comprises between 20% and 30% lactose. In these embodiments, the remaining source of carbohydrate may be provided by one or more of those known in the art including, but not limited to those previously disclosed as suitable for practicing the present invention.

The nutritional composition of the present invention may optionally include one or more of the following vitamins or derivatives thereof, including, but not limited to, biotin, biotin trituration, vitamin $B_1$ (e.g., thiamin, thiamin pyrophosphate, thiamin hydrochloride, thiamin triphosphate, thiamin mononitrate), vitamin $B_2$ (e.g., riboflavin, flavin mononucleotide, flavin adenine dinucleotide, lactoflavin, ovoflavin, sodium riboflavin, riboflavin-5'-phosphate), vitamin $B_3$ (e.g., niacin, nicotinic acid, nicotinamide, niacinamide, nicotinamide adenine dinucleotide, nicotinamide mononucleotide, nicotinamide adenine dinucleotide phosphate, pyridine-3-carboxylic acid, vitamin $B_3$ precursor tryptophan), folic acid (e.g., folate, folacin, pteroylglutamic acid, pteroylmonoglutamic acid, pteroylpolyglutamates), pantothenic acid (e.g., pantothenate, panthenol, calcium pantothenate), vitamin $B_6$ (e.g., pyridoxine hydrochloride, pyridoxine, pyridoxine-5'-phosphate, pyridoxal, pyridoxal-5'phosphate, pyridoxamine, pyridoxamine-5'-phosphate, pyridoxine glucoside), vitamin $B_{12}$ (e.g., cobalamin, methylcobalamin, deoxyadenosylcobalamin, cyanocobalamin, hydroxycobalamin, adenosylcobalamin, 5'-deoxyadenosylcobalamin), vitamin C (e.g., ascorbic acid, dehydroascorbic acid, L-ascorbic acid, sodium L-ascorbate, calcium L-ascorbate, ascorbyl palmitate), vitamin A (e.g., retinol, retinal, retinoic acid, vitamin A palimitate, retinyl acetate, retinyl palmitate, retinyl palmitate esters, retinyl esters, retinol esters), β-carotene, α-carotene, vitamin D (e.g., vitamin $D_3$, calciferol, cholecalciferol, dihydroxyvitamin D, 1,25-dihydroxycholecalciferol, 7-dehydrocholesterol, ergocalciferol), choline (e.g., choline chloride, choline bitartrate, lysophosphatidylcholine), vitamin E (e.g., vitamin E acetate, vitamin E tocopheryl acetate, α-tocopherol, α-tocopherol acetate, α-tocopherol succinate, α-tocopherol nicotinate, α-tocopherol esters, RRR-α-tocopherol, RRR-α-tocopherol acetate, RRR-α-tocopherol succinate, dL-α-tocopheryl acetate, dL-α-tocopheryl succinate, dL-α-tocopherol, dL-α-tocopherol acetate, dL-α-tocopherol succinate, γ-tocopherol), vitamin K (e.g., vitamin $K_1$ phytonadione, vitamin $K_2$, vitamin $K_3$, menadione, menaquinone, menaquinone-7, menaquinone-4, menaquinone-8, menaquinone-8H, menaquinone-9, menaquinone-9H, menaquinone-10, menaquinone-11, menaquinone-12, menaquinone-13, phylloquinone, naphthoquinone, 2',3'-dihydrophylloquinone), carnitine, L-carnitine, inositol, taurine, and any combinations thereof.

The nutritional composition of the present invention may optionally include one or more of the following minerals or derivatives thereof, including, but not limited to, boron, calcium, calcium acetate, calcium aspartate, calcium carbonate, calcium chloride, calcium citrate, calcium citrate malate, calcium D-saccharate, calcium gluconate, calcium gluconate monohydrate, calcium glycerol phosphate, calcium lactate, calcium phosphate, calcium propionate, calcium sulfate, chloride, chromium, chromium chloride, chromium picolinate, trivalent chromium, copper, copper gluconate, cupric sulfate, fluoride, iodide, iodine, calcium iodate, cuprous iodide, potassium iodate, potassium iodide, iron, iron trituration, elemental iron, ferrous sulfate heptahydrate, carbonyl iron, ferric iron, ferrous gluconate, ferrous glycine sulfonate, ferrous iron, ferrous fumarate, ferric orthophosphate, polysaccharide iron, magnesium, magnesium carbonate, magnesium hydroxide, magnesium oxide, magnesium phosphate, magnesium stearate, magnesium sulfate, manganese, manganese acetate, manganese chloride, manganese sulfate monohydrate, molybdenum, sodium molybdate, anyhydrous molybdenum, phosphorus, potassium, potassium acetate, potassium bicarbonate, potassium chloride, potassium citrate, potassium hydroxide, potassium phosphate, selenium, selenate, selenite trituration, sodium docusate, sulfur, sodium, sodium chloride, sodium citrate, sodium selenite, sodium sulfate, inorganic sulfate, zinc, zinc gluconate, zinc oxide, zinc sulfate, zinc sulfate monohydrate, and any combinations thereof. Non-limiting exemplary derivatives of mineral compounds include salts, alkaline salts, polysaccharides, esters, elemental minerals, and chelates of any mineral compound.

In some embodiments of the invention, the supplemental calcium source in the nutritional composition comprises calcium gluconate alone or in combination with a calcium source selected from the group consisting of calcium lactate, calcium sulfate, calcium chloride, calcium citrate, calcium phosphate, calcium D-saccharate, calcium aspartate, calcium propionate, and combinations thereof. In a particular embodiment of the invention, the sole supplemental calcium source in the nutritional composition comprises calcium gluconate.

In a separate embodiment, the composition of the invention may comprise a children's nutritional composition provided as a growing-up milk. Such invention may have a standard serving size of 200 ml, providing from about 60 to 75 kcal/100 ml of energy, with a recommended intake of two to three servings per day. In such an embodiment, the amounts and types of proteins, lipids and carbohydrates may vary. Protein may comprise from about 2.5 to 3.75 g/100 kcal, with carbohydrate providing from about 11 to about 16.5 g/100 kcal and lipids comprising from about 2.2 to about 4.4 g/100 kcal. Carbohydrate sources may be any known or used in the art as suitable for nutritional compositions, including but not limited to those disclosed herein. In an embodiment, sources of carbohydrate for use in the growing-up milk may include, but are not limited to, maltodextrins, fructose, lactose, prebiotics, resistant starch, starch, and any combinations thereof. In an embodiment, less than 10% of energy per serving of the growing-up milk may be contributed from sugars selected from the group consisting of: white sugar (glucose), brown sugar, corn syrup, corn syrup solids, high fructose corn syrup, malt syrup, maple syrup, liquid fructose, molasses, honey, anhydrous dextrose, and any combinations thereof.

When vitamin A is present in the growing-up milk, it may be present in a range of about 1 to about 150 mcg/serving. In another embodiment, vitamin A may be present in amounts ranging from about 57 to about 65 mcg/serving. Any source of vitamin A known in the art to have nutritional uses, including, but not limited to those previously disclosed for practicing the invention, may be suitable for use in the present composition. In an embodiment, sources of vitamin A for use in the growing-up milk may include preformed sources of vitamin A, such as retinyl acetate, retinyl palmitate, retinol and any combinations thereof.

When Vitamin C is present in the growing-up milk, it may be present in the range of about 0.1 to about 10 mg/serving. In another embodiment, vitamin C may be present at the level of 5 mg/serving. Any source of vitamin C known in the art to have nutritional uses, including, but not limited to those previously disclosed for practicing the invention, may be suitable for use in the present composition. In an embodiment, sources of vitamin C for use in the growing-up milk include L-ascorbic acid, sodium L-ascorbate, calcium L-ascorbate, ascorbyl palmitate, and any combinations thereof.

When thiamin is present in the growing-up milk, it may be present in the range of about 0.01 to about 0.5 mg/serving. In another embodiment, thiamin may be present in the range of 0.05 to about 0.15 mg/serving. In yet another embodiment, thiamin may be in the range of 0.08 to 0.10 mg/serving. Any source of thiamin known in the art to have nutritional uses, including, but not limited to those previously disclosed for practicing the invention, may be suitable for use in the present composition. In an embodiment, sources of thiamin for use in the growing-up milk include thiamin hydrochloride, thiamin mononitrate and any combinations thereof.

When riboflavin is present in the growing-up milk, it may be present in the range of about 0.01 to about 0.5 mg/serving. In another embodiment, riboflavin may be present in the range of 0.05 to about 0.15 mg/serving. In yet another embodiment, riboflavin may be in the range of 0.08 to 0.10 mg/serving. Any source of riboflavin known in the art to have nutritional uses, including, but not limited to those previously disclosed for practicing the invention, may be suitable for use in the present composition. In an embodiment, sources of riboflavin for use in the growing-up milk include free riboflavin, sodium riboflavin, riboflavin-5'phosphate, and any combinations thereof.

When vitamin $B_6$ is present in the growing-up milk, it may be present in the range of about 0.01 to about 0.5 mg/serving. In another embodiment, vitamin $B_6$ may be present in the range of 0.05 to about 0.15 mg/serving. In yet another embodiment, the level of vitamin $B_6$ may be in the range of 0.08 to 0.10 mg/serving. Any source of vitamin $B_6$ known in the art to have nutritional uses, including, but not limited to those previously disclosed for practicing the invention, may be suitable for use in the present composition. In an embodiment, sources of vitamin $B_6$ for use in the growing-up milk include pyridoxine hydrochloride, pyridoxine-5'-phosphate and any combinations thereof.

When folate is present in the growing-up milk, it may be present in the range of 5 to 50 mcg/serving. In another embodiment, the folate content may be 10 to 40 mcg/serving. In yet another embodiment, the folate content may be within the range of 20 to 35 mcg/serving. Any source of folate known in the art to have nutritional uses, including, but not limited to those previously disclosed for practicing the invention, may be suitable for use in the present composition. In an embodiment, the source of folate for use in the growing-up milk is folic acid.

When vitamin D is present in the growing-up milk, it may be present in the range of 0.1 to about 2 mcg/serving. In yet another embodiment, the vitamin D content of the growing-up milk may be 0.5 to 1 mcg/serving. Any source of vitamin D known in the art to have nutritional uses, including, but not limited to those previously disclosed for practicing the present invention, may be suitable for use in the present composition. In an embodiment, sources of vitamin D for use in the growing-up milk include cholecalciferol, ergocalciferol and any combinations thereof.

When calcium is present in the growing-up milk, total calcium may be present in the range of about 165 to about 300 mg/serving. In another embodiment, the level of total calcium in the growing-up milk may be provided in the range of about 180 to 250 mg/serving. Any source of calcium known in the art to have nutritional uses, including, but not limited to those previously disclosed for practicing the present invention, may be suitable for use in the present composition.

When iron is provided in the growing-up milk, it may be present in the range of 0.1 to 2.2 mg/serving. In another embodiment, iron may be present in the range of 0.5 to 1.8 mg/serving. In yet another embodiment, the level of iron provided in the growing-up milk may be in the range of 1.0 to 1.4 mg/serving. Any source of iron known in the art to have nutritional uses, including, but not limited to those previously disclosed for practicing the present invention, may be suitable for use in the present composition. In an embodiment, sources of iron for use in the growing-up milk include ferrous sulfate, ferrous fumarate, and any combinations thereof.

When zinc is provided in the growing-up milk, it may be present in the range of 0.2 to 1.5 mg/serving. In another embodiment, zinc may be present in the range of 0.5 to 1.0 mg/serving. Any source of zinc known in the art to have nutritional uses, including, but not limited to those previously disclosed for practicing the present invention, may be suitable for use in the present composition. In an embodiment, zinc is provided as zinc sulfate.

When iodine is present in the growing-up milk, it may be present in the range of 0.2 to 41 mcg/serving. In another embodiment, iodine may be present in the range of 5 to 15 mcg/serving. Any source of iodine known in the art to have nutritional uses, including, but not limited to those previously disclosed for practicing the present invention, may be suitable for use in the present composition. In an embodiment, sources of iodine for use with the growing-up milk include sodium iodide, potassium iodide and any combinations thereof.

In another embodiment wherein the inventive composition is a growing-up milk formulated for children between the ages of 1 to 6 years, vitamins and minerals may be added in varying amounts and ranges based on a per-serving basis. In an embodiment, one serving of the growing-up milk may contain from about 15% to about 50% of the Estimated Average Requirement (EAR) for children between the ages of 1 and 6 years for the following nutrients: vitamin E, vitamin K, niacin, pantothenic acid, vitamin $B_{12}$, biotin, choline, potassium, magnesium, phosphorus, chloride, copper, selenium, fluoride, and any combinations thereof. In an embodiment, one serving of the growing-up milk may contain from about 20% to about 30% of the EAR for children between the ages of 1 and 6 years for the following nutrients: vitamin E, vitamin K, niacin, pantothenic acid, vitamin $B_{12}$, biotin, choline, potassium, magnesium, phosphorus, chloride, copper, selenium, fluoride, and any combinations thereof. Any known sources of these nutrients having nutritional uses, including, but not limited to those disclosed herein may be suitable for use in the composition.

The composition of the invention may optionally contain other substances that may have a beneficial effect on the host such as lactoferrin, nucleotides, nucleosides, immunoglobulins, CMP equivalents (cytidine 5'-monophosphate, free acid), UMP equivalents (uridine 5'-monophosphate, disodium salt), AMP equivalents (adenosine 5'-monophosphate, free acid), GMP equivalents (guanosine 5'-monophosphate, disodium salt), and combinations thereof.

In one embodiment of the invention, the nutritional composition may contain one or more probiotics. The term "probiotic" means a microorganism that exerts beneficial effects on the health of the host. Any probiotic known in the art may be acceptable in this embodiment provided it achieves the intended result. In a particular embodiment, the probiotic may be selected from *Lactobacillus* species, *Lactobacillus rhamnosus* GG, *Bifidobacterium* species, *Bifidobacterium longum,* and *Bifidobacterium animalis* subsp. *lactis* BB-12.

If included in the composition, the amount of the probiotic may vary from about $10^4$ to about $10^{10}$ colony forming units (cfu) per kg body weight per day. In another embodiment, the amount of the probiotic may vary from about $10^6$ to about $10^9$ cfu per kg body weight per day. In yet another embodiment, the amount of the probiotic may be at least about $10^6$ cfu per kg body weight per day.

In an embodiment, the probiotic(s) may be viable or non-viable. As used herein, the term "viable", refers to live microorganisms. The term "non-viable" or "non-viable probiotic" means non-living probiotic microorganisms, their cellular components and metabolites thereof. Such non-viable probiotics may have been heat-killed or otherwise inactivated but retain the ability to favorably influence the health of the host. The probiotics useful in the present invention may be naturally-occurring, synthetic or developed through the genetic manipulation of organisms, whether such new source is now known or later developed.

In another embodiment of the invention, the nutritional composition may contain one or more prebiotics. The term "prebiotic" as used herein refers to indigestible food ingredients which exert health benefits upon the host. Such health benefits may include, but are not limited to, selective stimulation of the growth and/or activity of one or a limited number of beneficial gut bacteria, stimulation of the growth and/or activity of ingested probiotic microorganisms, selective reduction in gut pathogens, and favorable influence on gut short chain fatty acid profile. Any prebiotic known in the art will be acceptable in this embodiment provided it achieves the desired result. Such prebiotics may be naturally-occurring, synthetic, or developed through the genetic manipulation of organisms and/or plants, whether such new source is now known or developed later. Prebiotics useful in the present invention may include oligosaccharides, polysaccharides, and other prebiotics that contain fructose, xylose, soya, galactose, glucose and mannose. More specifically, prebiotics useful in the present invention may include lactulose, lactosucrose, raffinose, gluco-oligosaccharide, inulin, polydextrose, polydextrose powder, galacto-oligosaccharide, galacto-oligosaccharide syrup, fructo-oligosaccharide, isomalto-oligosaccharide, soybean oligosaccharides, lactosucrose, xylo-oligosaccharide, chito-oligosaccharide, manno-oligosaccharide, aribino-oligosaccharide, siallyl-oligosaccharide, fuco-oligosaccharide, and gentio-oligosaccharides.

In an embodiment, the total amount of prebiotics present in the nutritional composition may be from about 1.0 g/L to about 10.0 g/L of the composition. In another embodiment, the total amount of prebiotics present in the nutritional composition may be from about 2.0 g/L and about 8.0 g/L of the composition. In yet another embodiment, the total amount of prebiotics present in the nutritional composition may be about 4.0 g/L of the composition.

If galacto-oligosaccharide is used as a prebiotic, the amount of galacto-oligosaccharide in the nutritional composition may, in an embodiment, be within the range of from about 1.0 g/L to about 4.0 g/L. In another embodiment, the amount of galacto-oligosaccharide in the nutritional composition may be about 2.0 g/L. In yet another embodiment, the amount of galacto-oligosaccharide in the nutritional composition may be about 4.0 g/L. If polydextrose is used as a prebiotic, the amount of polydextrose in the nutritional composition may, in an embodiment, be within the range of from about 1.0 g/L to about 4.0 g/L. In another embodiment, the amount of polydextrose in the nutritional composition may be about 2.0 g/L. In a particular embodiment, galacto-oligosaccharide and polydextrose are supplemented into the nutritional composition in a total amount of about 4.0 g/L. In this embodiment, the amount of galacto-oligosaccharide may be about 2.0 g/L and the amount of polydextrose may be about 2.0 g/L.

If galacto-oligosaccharide is used as a prebiotic, the amount of galacto-oligosaccharide in the nutritional composition may, in an embodiment, be from about 0.1 mg/100 Kcal to about 1.0 mg/100 Kcal. In another embodiment, the amount of galacto-oligosaccharide in the nutritional composition may be from about 0.1 mg/100 Kcal to about 0.5 mg/100 Kcal. In yet another embodiment, the amount of galacto-oligosaccharide in the nutritional composition may be about 0.6 mg/100 Kcal. If polydextrose is used as a prebiotic, the amount of polydextrose in the nutritional composition may, in an embodiment, be within the range of from about 0.1 mg/100 Kcal to about 0.5 mg/100 Kcal. In another embodiment, the amount of polydextrose may be about 0.3 mg/100 Kcal. In a particular embodiment, galacto-oligosaccharide and polydextrose are supplemented into the nutritional composition in a total amount of about 0.6 mg/100 Kcal. In this embodiment, the amount of galacto-oligosaccharide may be about 0.3 mg/100 Kcal and the amount of polydextrose may be about 0.3 mg/100 Kcal.

In yet another embodiment of the present invention, the formulation may contain other active agents such as long chain polyunsaturated fatty acids (LCPUFAs). Suitable LCPUFAs include, but are not limited to, α-linoleic acid, γ-linoleic acid, linoleic acid, linolenic acid, eicosapentanoic acid (EPA), arachidonic acid (ARA) and/or docosahexaenoic acid (DHA). In an embodiment, the nutritional composition is supplemented with DHA. In another embodiment, the nutritional composition is supplemented with ARA. In yet another embodiment, the nutritional composition is supplemented with both DHA and ARA.

In one embodiment, the nutritional composition is supplemented with both DHA and ARA. In this embodiment, the weight ratio of ARA:DHA may be from about 1:3 to about 9:1. In one embodiment of the present invention, this ratio is from about 1:2 to about 4:1. In yet another embodiment, the ratio is from about 2:3 to about 2:1. In one particular embodiment the ratio is about 2:1. In another particular embodiment of the invention, the ratio is about 1:1.5. In other embodiments, the ratio is about 1:1.3. In still other embodiments, the ratio is about 1:1.9. In a particular embodiment, the ratio is about 1.5:1. In a further embodiment, the ratio is about 1.47:1.

In certain embodiments of the invention, the level of DHA is in the range of about 0.0% and 1.00% of fatty acids, by weight. The level of DHA may be about 0.32% by weight. In some embodiments, the level of DHA may be about 0.33% by weight. In another embodiment, the level of DHA may be about 0.64% by weight. In another embodiment, the level of DHA may be about 0.67% by weight. In yet another embodiment, the level of DHA may be about 0.96% by weight. In a further embodiment, the level of DHA may be about 1.00% by weight.

If included, the amount of DHA in an embodiment of the present invention is typically from about 3 mg per kg of body weight per day to about 150 mg per kg of body weight per day. In one embodiment of the invention, the amount is from about 6 mg per kg of body weight per day to about 100 mg per kg of body weight per day. In another embodiment the amount is from about 10 mg per kg of body weight per day to about 60 mg per kg of body weight per day. In yet another embodiment the amount is from about 15 mg per kg of body weight per day to about 30 mg per kg of body weight per day.

If included, the amount of DHA in the nutritional composition may vary from about 5 mg/100 kcal to about 80 mg/100 kcal. In one embodiment of the present invention, DHA varies from about 10 mg/100 kcal to about 50 mg/100 kcal; and in another embodiment, from about 15 mg/100 kcal to about 20 mg/100 kcal. In a particular embodiment of the present invention, the amount of DHA is about 17 mg/100 kcal.

In embodiments of the invention, the level of ARA is in the range of 0.0% and 0.67% of fatty acids, by weight. In another embodiment, the level of ARA may be about 0.67% by weight. In another embodiment, the level of ARA may be about 0.5% by weight. In yet another embodiment, the level of DHA may be in the range of about 0.47% and 0.48% by weight.

If included, the amount of ARA in an embodiment of the present invention is typically from about 5 mg per kg of body weight per day to about 150 mg per kg of body weight per day. In one embodiment of this invention, the amount varies from about 10 mg per kg of body weight per day to about 120 mg per kg of body weight per day. In another embodiment, the amount varies from about 15 mg per kg of body weight per day to about 90 mg per kg of body weight per day. In yet another embodiment, the amount varies from about 20 mg per kg of body weight per day to about 60 mg per kg of body weight per day.

If included, the amount of ARA in the nutritional composition may vary from about 10 mg/100 kcal to about 100 mg/100 kcal. In one embodiment of the present invention, the amount of ARA varies from about 15 mg/100 kcal to about 70 mg/100 kcal. In another embodiment, the amount of ARA varies from about 20 mg/100 kcal to about 40 mg/100 kcal. In a particular embodiment of the present invention, the amount of ARA is about 25 mg/100 kcal.

If included, the nutritional composition may be supplemented with oils containing DHA and ARA using standard techniques known in the art. For example, DHA and ARA may be added to the formula by replacing an equivalent amount of an oil, such as high oleic sunflower oil, normally present in the formula. As another example, the oils containing DHA and ARA may be added to the formula by replacing an equivalent amount of the rest of the overall fat blend normally present in the formula without DHA and ARA.

If utilized, the source of DHA and ARA may be any source known in the art such as marine oil, fish oil, single cell oil, egg yolk lipid, and brain lipid. In some embodiments, the DHA and ARA are sourced from the single cell Martek oil, DHASCO®, or variations thereof. The DHA and ARA can be in natural form, provided that the remainder of the LCPUFA source does not result in any substantial deleterious effect on the infant. Alternatively, the DHA and ARA can be used in refined form.

In an embodiment of the present invention, sources of DHA and ARA are single cell oils as taught in U.S. Pat. Nos. 5,374,567; 5,550,156; and 5,397,591, the disclosures of which are incorporated herein in their entirety by reference. However, the present invention is not limited to only such oils.

In one embodiment, a LCPUFA source which contains EPA is used in the nutritional composition. In another embodiment, a LCPUFA source which is substantially free of EPA is used in the nutritional composition. For example, in one embodiment of the present invention, the nutritional composition contains less than about 16 mg EPA/100 kcal. In another embodiment, the nutritional composition contains less than about 10 mg EPA/100 kcal. In yet another embodiment, the nutritional composition contains less than about 5 mg EPA/100 kcal. Another embodiment of the invention includes a nutritional composition that is free of even trace amounts of EPA.

The nutritional composition of the invention also may contain emulsifiers. Examples of suitable emulsifiers include, but are not limited to, lecithin (e.g., from egg or soy), and/or mono- and di-glycerides and mixtures thereof. Other emulsifiers are readily apparent to the skilled artisan and selection of suitable emulsifier(s) will depend, in part, upon the formulation and final product.

The nutritional composition of the invention may optionally contain one or more stabilizers. Suitable stabilizers for use in the nutritional composition of the present invention, include, but are not limited to, gum Arabic, gum ghatti, gum karaya, gum tragacanth, agar, furcellaran, guar gum, gellan gum, locust bean gum, pectin, low methoxyl pectin, gelatin, microcrystalline cellulose, CMC (sodium carboxymethylcellulose), methylcellulose hydroxypropyl methylcellulose, hydroxypropyl cellulose, DATEM (diactyl tartaric acid esters of mono- and di-glycerides), dextran, carrageenans, and mixtures thereof.

The nutritional composition of the present invention may optionally include one or more preservatives that may also be added to extend product shelf life. Suitable preservatives include, but are not limited to, potassium sorbate, sodium sorbate, potassium benzoate, sodium benzoate, calcium disodium EDTA, and mixtures thereof.

The nutritional composition of the present invention may optionally include one or more of the following flavoring agents, including but not limited to, flavored extracts, volatile oils, cocoa or chocolate flavorings, vanilla or vanilla extract, peanut butter flavoring, honey, cookie crumbs or any commercially available flavoring. Further non-limiting examples of flavoring agents useful in the nutritional composition of the present invention include, but are not limited to, pure anise extract, imitation banan extract, imitation cherry extract, chocolate extract, pure lemon extract, pure orange extract, pure peppermint extract, imitation pineapple extract, imitation rum extract, imitation strawberry extract; or volatile oils, such as balm oil, bay oil, bergamot oil, cedarwood oil, cherry oil, cinnamon oil, clove oil, or peppermint oil; butterscotch, toffee, and mixtures thereof. The amounts of flavoring agent can vary greatly depending upon the flavoring agent used. The type and amount of flavoring agent used can be selected as is known in the art.

In a particular embodiment of the invention, the level of TGF-$\beta$ in the inventive composition is from about 0.0150 (pg/$\mu$g) ppm to about 0.1000 (pg/$\mu$g) ppm. In another embodiment, the level of TGF-$\beta$ in the inventive composition is from about 0.0225 (pg/$\mu$g) ppm to about 0.0750 (pg/$\mu$g) ppm. In yet another embodiment, the level of TGF-$\beta$ in the inventive composition is from about 0.0300 (pg/$\mu$g) ppm to about 0.0600 (pg/$\mu$g) ppm. In a particular embodiment, the level of TGF-$\beta$ in the inventive composition is about 0.0340 (pg/$\mu$g) ppm.

In a particular embodiment of the invention, the level of TGF-$\beta$ in the inventive composition is from about 2500 pg/mL to about 10,000 pg/mL composition. In another embodiment, the level of TGF-$\beta$ in the inventive composition is from about 3000 pg/mL to about 8000 pg/mL. In yet another embodiment, the level of TGF-$\beta$ in the inventive composition is from about 4000 pg/mL to about 6000 pg/mL. In a particular embodiment, the level of TGF-$\beta$ in the inventive composition is about 5000 pg/mL.

In an embodiment, the level of TGF-$\beta1$ in the inventive composition is from about 0.0001 (pg/$\mu$g) ppm to about 0.0075 (pg/$\mu$g) ppm. In another embodiment, the level of TGF-$\beta1$ in the inventive composition is from about 0.0010 (pg/$\mu$g) ppm to about 0.0050 (pg/$\mu$g) ppm. In yet another embodiment, the level of TGF-$\beta1$ in the inventive composition is from about 0.0020 (pg/$\mu$g) ppm to about 0.0035 (pg/$\mu$g) ppm. In still another embodiment, the level of TGF-$\beta1$ in the inventive composition is about 0.0030 (pg/$\mu$g) ppm.

In an embodiment, the level of TGF-$\beta2$ in the inventive composition is from about 0.0150 (pg/$\mu$g) ppm to about 0.0750 (pg/$\mu$g) ppm. In another embodiment, the level of TGF-$\beta2$ in the inventive composition is from about 0.0250 (pg/$\mu$g) ppm to about 0.0500 (pg/$\mu$g) ppm. In yet another embodiment, the level of TGF-$\beta2$ in the inventive composition is from about 0.0300 (pg/$\mu$g) ppm to about 0.0400 (pg/$\mu$g) ppm. In still another embodiment, the level of TGF-$\beta2$ in the inventive composition is about 0.0320 (pg/$\mu$g) ppm.

In an embodiment, the ratio of TGF-$\beta1$:TGF-$\beta2$ in the inventive composition is in the range of about 1:1 to about 1:20. In another embodiment, the ratio of TGF-$\beta1$:TGF-$\beta2$ in the inventive composition is in the range of about 1:5 to about 1:15. In still another embodiment, the ratio of TGF-$\beta1$:TGF-$\beta2$ in the inventive composition is in the range of about 1:8 to about 1:13. In a particular embodiment, the ratio of TGF-$\beta1$:TGF-$\beta2$ in the inventive composition is about 1:11.

In an embodiment, the bioactivity of TGF-$\beta$ within the inventive composition is from about 500 ng Eq/100 kcal to about 5000 ng Eq/100 kcal. In another embodiment, the bioactivity of TGF-$\beta$ within the inventive composition is from about 750 ng Eq/100 kcal to about 3000 ng Eq/100 kcal. In yet another embodiment, the bioactivity of TGF-$\beta$ within the inventive composition is from about 800 ng Eq/100 kcal to about 2500 ng Eq/100 kcal. In one embodiment, the bioactivity is about 860 ng Eq/100 kcal. In another embodiment, the bioactivity is about 1700 ng Eq/100 kcal. In another embodiment, the bioactivity is about 1200 ng Eq/100 kcal.

Alternatively, the bioactivity of TGF-$\beta$ in the inventive composition can be defined in terms of $IC_{50}$ in a HT-2 cell growth inhibition assay. In an embodiment, the bioactivity of the composition comprises an $IC_{50}$ from about 1.1 mg/ml to about 5.0 mg/ml. In another embodiment, the bioactivity of the composition comprises an $IC_{50}$ from about 1.2 mg/ml to about 3.0 mg/ml. In yet another embodiment, the bioactivity of the composition comprises an $IC_{50}$ from about 1.3 mg/ml to about 3.0 mg/ml. In still another embodiment, the bioactivity of the composition comprises an $IC_{50}$ from about 1.3 mg/ml to about 2.0 mg/ml. In an embodiment, the bioactivity of the composition comprises an $IC_{50}$ of about 1.5 mg/ml.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples, all percentages are given on a weight basis unless otherwise indicated.

Example 1

This example illustrates an embodiment of the method of the invention. In this example, the ingredients set forth in Table 3 were intermixed.

TABLE 3

Nutritional Product Ingredients

| Ingredient | Kgs per 10,000 L |
|---|---|
| Whey Protein Concentrate, 35% Protein, Super Sack | 198.360 |
| Fat Blend, Bulk (palm olein oil, coconut oil, soy oil, and high oleic sunflower oil) | 340.059 |
| Non-Fat Dry Milk, Medium-Heat, Spray Dried | 199.240 |
| Lactose | 550.000 |
| Single Cell Arachidonic Acid Oil and Docosahexanoic Oil Blend | 9.365 |
| Potassium Citrate | 7.797 |
| Mono- and Diglycerides | 7.233 |
| Dry Vitamin Premix | 3.959 |
| Lecinithin Concentrate | 3.694 |
| Calcium Carbonate | 3.680 |
| Carrageenan | 2.826 |
| Calcium Chloride, Dihydrate | 2.650 |
| Sodium Chloride | 1.230 |
| Choline Chloride | 1.018 |
| Calcium Phosphate, Tribasic, Ultrafine | 0.879 |
| Nucleotide Premix | 0.696 |
| Ferrous Sulfate, Heptahydrate | 0.693 |

TABLE 3-continued

Nutritional Product Ingredients

| Ingredient | Kgs per 10,000 L |
|---|---|
| Sodium Citrate, Dihydrate, Granular | 0.455 |
| Premix of Vitamins A, D, E, & K | 0.324 |
| Trace/Ultratrace Mineral Premix | 0.304 |
| Water, Defluoridated | 8.984.838 |

The mixture was then subjected to direct steam injection at 73° C. for 15 to 30 seconds. Afterward, the mixture was homogenized at 55° C. to 65° C. for 5 to 15 seconds. Finally, the mixture was retorted at 141° C. to 145° C. for 3 to 5 seconds. The mixture was then aseptically packaged and sealed.

Example 2

This example illustrates an embodiment of a powdered infant formula of the present invention.

TABLE 4

Ingredients

| Ingredient | Amount per 100 kg |
|---|---|
| Lactose, Grind A | 35.119 kg |
| Palm Olein Oil | 12.264 kg |
| Coconut Oil | 5.451 kg |
| Soy Oil | 5.451 kg |
| High Oleic Sunflower Oil | 4.088 kg |
| Non-Fat Dry Milk, Medium-Heat, Spray Dried | 14.667 kg |
| Whey Protein Concentrate, 35% Protein, Super Sack | 14.667 kg |
| Galacto-Oligosaccharide Syrup (77% solids, 44% fiber) | 3.477 kg |
| Polydextrose Power (96% total solids, 96% carbohydrate, 86% fiber) | 1.770 kg |
| Calcium Gluconate, Monohydrate | 1.606 kg |
| Single Cell Arachidonic Acid Oil | 0.347 kg |
| Single Cell Docosahexaenoic Acid Oil | 0.238 kg |
| Choline Bitartrate | 0.228 kg |
| Potassium Chloride | 0.198 kg |
| Sodium Chloride | 24.780 g |
| Magnesium Oxide, Light | 22.790 g |
| L-Carnitine | 9.910 g |
| Ascorbic Acid | 156.687 g |
| Inositol | 39.887 g |
| Corn Syrup Solids | 35.478 g |
| Taurine | 33.875 g |
| Dry vitamin E Tocopheryl Acetate, 50% | 25.279 g |
| Vitamin A Palmitate, Dry Beadlets, CW Dispersible, 250 | 7.871 g |
| Niacinamide | 6.475 g |
| Vitamin K1 Dry Phytonadione USP Powder, 1% | 5.454 g |
| Calcium Pantothenate | 3.299 g |
| Vitamin $B_{12}$, 0.1% in starch | 2.122 g |
| Biotin Trituration, 1% | 1.608 g |
| Vitamin $D_3$ Powder | 0.969 g |
| Riboflavin | 0.755 g |
| Thiamine Hydrochloride | 0.601 g |
| Pyridoxine Hydrochloride | 0.518 g |
| Folic Acid | 0.122 g |
| Corn Syrup Solids | 192.187 g |
| Ferrous Sulfate, Heptahydrate | 49.600 g |
| Ascorbic Acid | 6.213 g |
| Malto-Dextrin | 146.096 g |
| Cytidine 5'-Monophosphate, Free Acid | 11.604 g |
| Uridine 5'-Monophosphate, Disodium Salt | 3.419 g |
| Adenosine 5'-Monophosphate, Free Acid | 2.711 g |
| Guanosine 5'-Monophosphate, Disodium Salt | 2.170 g |
| Lactose, Grind A | 138.017 g |
| Zinc Sulfate, Monohydrate | 16.422 g |
| Corn Syrup Solids | 3.616 g |
| Sodium Selenite, Anhydrous | 0.018 g |

TABLE 4-continued

Ingredients

| Ingredient | Amount per 100 kg |
|---|---|
| Cupric Sulfate, Powder ($CuSO_4 \cdot 5H_2O$) | 1.688 g |
| Manganese Sulfate, Monohydrate | 0.239 g |

TABLE 5

Proximate Analysis

| | Grams per 100 g | Grams per 100 mL at Normal Dilution | Caloric Distribution |
|---|---|---|---|
| Protein | 10.84 | 1.47 | 8.50 |
| Fat | 28.57 | 3.89 | 50.67 |
| Carbohydrate | 54.87 | 7.46 | 40.83 |
| Ash | 2.70 | 0.37 | |
| Moisture | 3.02 | 89.9 | |
| Calories | 508 | 69.1 | |

TABLE 6

Nutrients

| Nutrient | Quantities per 100 Calories |
|---|---|
| Calories | 100 |
| Protein, g | 2.1 |
| Fat, g | 5.6 |
| Carbohydrates, g | 10.6 |
| Ash, g | 0.6 |
| Water, mL (normal dilution) | 133 |
| Linoleic Acid, mg | 900 |
| α-Linolenic Acid, mg | 85 |
| Arachidonic Acid, mg | 25 |
| Docosahexaenoic Acid, mg | 17 |
| Vitamin A, IU | 300 |
| Vitamin D, IU | 60 |
| Vitamin E, IU | 2 |
| Vitamin K, mcg | 8 |
| Thiamin, mcg | 80 |
| Riboflavin, mcg | 140 |
| Vitamin $B_6$, mcg | 60 |
| Vitamin $B_{12}$, mcg | 0.3 |
| Niacin, mcg | 1000 |
| Folic Acid, mcg | 16 |
| Pantothenic Acid, mcg | 500 |
| Biotin, mcg | 3 |
| Vitamin C, mg | 12 |
| Choline, mg | 24 |
| Inositol, mg | 6 |
| Taurine, mg | 6 |
| Carnitine, mg | 2 |
| Calcium, mg | 78 |
| Phosphorus, mg | 43 |
| Magnesium, mg | 8 |
| Iron, mg | 1.8 |
| Zinc, mg | 1 |
| Manganese, mcg | 15 |
| Copper, mcg | 75 |
| Iodine, mcg | 10 |
| Sodium, mg | 27 |
| Potassium, mg | 108 |
| Chloride, mg | 63 |
| Selenium, mcg | 2.8 |
| Polydextrose | 0.3 |
| Galacto-oligosaccharide | 0.3 |
| AMP Equivalents, mg | 0.5 |
| CMP Equivalents, mg | 2.5 |
| GMP Equivalents, mg | 0.3 |
| UMP Equivalents, mg | 0.9 |
| Nucleotide Equivalents, mg | 4.2 |

To prepare 1 liter of product at standard dilution (20 kcal/fl. oz.), 136 grams of powder was mixed with 895.2 grams of water. To prepare 1 quart of product at standard dilution, 128.7 grams of powder was mixed with 847.2 grams water.

Upon reconstitution, the infant formula described in this example contains approximately 2 g/L of galacto-oligosaccharide and 2 g/L of polydextrose. The infant formula has an ARA level of 25 mg/100 kcal. The formula contains 5.6 g fat/100 kcal, to achieve a fat content which is similar to human milk. The formula additionally has a low buffer strength.

All pH adjustments with regard to this infant formula were made with solutions of potassium hydroxide. The specific gravity of the formula is 1.03117.

Example 3

This example illustrates another embodiment of a powdered infant formula of the present invention.

TABLE 7

Ingredients

| Ingredient | Amount per 100 kg |
|---|---|
| Lactose, Grind A | 34.277 kg |
| Palm Olein Oil | 12.267 kg |
| Coconut Oil | 5.452 kg |
| Soy Oil | 5.452 kg |
| High Oleic Sunflower Oil | 4.089 kg |
| Non-Fat Dry Milk, Medium-Heat, Spray Dried | 14.670 kg |
| Whey Protein Concentrate, 35% Protein, Super Sack | 14.670 kg |
| Galacto-Oligosaccharide Syrup (77% solids, 44% fiber) | 6.840 kg |
| Calcium Gluconate, Monohydrate | 1.606 kg |
| Single Cell Arachidonic Acid Oil | 0.347 kg |
| Single Cell Docosahexaenoic Acid Oil | 0.238 kg |
| Choline Bitartrate | 0.228 kg |
| Potassium Chloride | 0.198 kg |
| Sodium Chloride | 24.780 g |
| Magnesium Oxide, Light | 22.794 g |
| L-Carnitine | 9.911 g |
| Ascorbic Acid | 146.436 g |
| Inositol | 37.278 g |
| Corn Syrup Solids | 33.159 g |
| Taurine | 31.659 g |
| Dry vitamin E Tocopheryl Acetate, 50% | 23.625 g |
| Vitamin A Palmitate, Dry Beadlets, CW Dispersible, 250 | 7.356 g |
| Niacinamide | 6.051 g |
| Vitamin K1 Dry Phytonadione USP Powder, 1% | 5.097 g |
| Calcium Pantothenate | 3.084 g |
| Vitamin $B_{12}$, 0.1% in starch | 1.983 g |
| Biotin Trituration, 1% | 1.503 g |
| Vitamin $D_3$ Powder | 0.906 g |
| Riboflavin | 0.705 g |
| Thiamine Hydrochloride | 0.561 g |
| Pyridoxine Hydrochloride | 0.483 g |
| Folic Acid | 0.114 g |
| Corn Syrup Solids | 192.187 g |
| Ferrous Sulfate, Heptahydrate | 49.600 g |
| Ascorbic Acid | 6.213 g |
| Malto-Dextrin | 146.096 g |
| Cytidine 5'-Monohposphate, Free Acid | 11.604 g |
| Uridine 5'-Monophosphate, Disodium Salt | 3.419 g |
| Adenosine 5'-Monophosphate, Free Acid | 2.711 g |
| Guanosine 5'-Monophosphate, Disodium Salt | 2.170 g |
| Lactose, Grind A | 138.017 g |
| Zinc Sulfate, Monohydrate | 16.422 g |
| Corn Syrup Solids | 3.616 g |
| Sodium Selenite, Anhydrous | 0.018 g |
| Cupric Sulfate, Powder ($CuSO_4 \cdot 5H_2O$) | 1.688 g |
| Manganese Sulfate, Monohydrate | 0.239 g |

TABLE 8

Proximate Analysis

| | Grams per 100 g | Grams per 100 mL at Normal Dilution | Caloric Distribution |
|---|---|---|---|
| Protein | 10.84 | 1.47 | 8.34 |
| Fat | 28.57 | 3.89 | 49.50 |
| Carbohydrate | 54.87 | 7.46 | 42.16 |
| Ash | 2.70 | 0.37 | |
| Moisture | 3.02 | 89.9 | |
| Calories | 510 | 69.4 | |

TABLE 9

Nutrients

| Nutrient | Quantities per 100 Calories |
|---|---|
| Calories | 100 |
| Protein, g | 2.1 |
| Fat, g | 5.6 |
| Carbohydrates, g | 10.6 |
| Ash, g | 0.6 |
| Water, mL (normal dilution) | 133 |
| Linoleic Acid, mg | 900 |
| α-Linolenic Acid, mg | 85 |
| Arachidonic Acid, mg | 25 |
| Docosahexaenoic Acid, mg | 17 |
| Vitamin A, IU | 300 |
| Vitamin D, IU | 60 |
| Vitamin E, IU | 2 |
| Vitamin K, mcg | 8 |
| Thiamin, mcg | 80 |
| Riboflavin, mcg | 140 |
| Vitamin $B_6$, mcg | 60 |
| Vitamin $B_{12}$, mcg | 0.3 |
| Niacin, mcg | 1000 |
| Folic Acid, mcg | 16 |
| Pantothenic Acid, mcg | 500 |
| Biotin, mcg | 3 |
| Vitamin C, mg | 12 |
| Choline, mg | 24 |
| Inositol, mg | 6 |
| Taurine, mg | 6 |
| Carnitine, mg | 2 |
| Calcium, mg | 78 |
| Phosphorus, mg | 43 |
| Magnesium, mg | 8 |
| Iron, mg | 1.8 |
| Zinc, mg | 1 |
| Manganese, mcg | 15 |
| Copper, mcg | 75 |
| Iodine, mcg | 10 |
| Sodium, mg | 27 |
| Potassium, mg | 108 |
| Chloride, mg | 63 |
| Selenium, mcg | 2.8 |
| Galacto-oligosaccharide | 0.6 |
| AMP Equivalents, mg | 0.5 |
| CMP Equivalents, mg | 2.5 |
| GMP Equivalents, mg | 0.3 |
| UMP Equivalents, mg | 0.9 |
| Nucleotide Equivalents, mg | 4.2 |

To prepare 1 liter of product at standard dilution (20 kcal/fl. oz.), 136 grams of powder was mixed with 895.2 grams of water. To prepare 1 quart of product at standard dilution, 128.7 grams of powder was mixed with 847.2 grams water.

Upon reconstitution, the infant formula described in this example contains approximately 4 g/L of galacto-oligosaccharide and has an ARA level of 25 mg/100 kcal. The formula contains 5.6 g fat/100 kcal, to achieve a fat content which is similar to human milk. The formula additionally has a low buffer strength.

All pH adjustments with regard to this infant formula were made with solutions of potassium hydroxide. The specific gravity of the formula is 1.03117.

Example 4

FIG. 2 illustrates a comparison of standard processing to the inventive process and its effect on TGF-β bioactivity. The inventive process is indicated in the figure by the term "NP", meaning new process. The standard process is indicated in the figure by the term "OP", meaning old process. The relative bioactivity of the sample using standard processing techniques was about 7000. The relative bioactivity of the sample using the inventive method was about 36,000. As can be seen, this is an increase in bioactivity of TGF-β of about 414%. In addition, the bioactivity of the sample using the inventive process was almost equivalent to the bioactivity elicited by 100 pg/ml of recombinant human TGF-β.

The method of the experiment illustrated in FIG. 2 was a bioassay of alkaline phosphatase. TGF-β is known to induce immune signaling pathways in cells which can be measured by secretory Alkaline phosphatase. Suppresion of TGF-β activity using an inhibitor thereby reduces the secretory alkaline phophatase and its activity. This shows that the activity observed is specific to TGF-β. As shown in FIG. 2, the "+" symbol represents the inhibitor. The use of inhibitor in all the active samples show that the activity is TGF-β-specific.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. For example, while methods for the production of a commercially sterile liquid nutritional supplement made according to those methods have been exemplified, other uses are contemplated. Therefore, the spirit and scope of the appended claims should not be limited to the description of the preferred versions contained therein.

What is claimed is:

1. A method of preparing a liquid nutritional product comprising transforming growth factor-beta (TGFβ) wherein the liquid nutritional product retains bioactivity of the TGF-β, the method comprising, in the listed order, the steps of:
   a. selecting one or more protein ingredients including at least one whey protein powder selected from the group consisting of sweet whey, demineralized whey, whey protein concentrate, whey protein isolate and combinations thereof that have been subjected to a heat load comprising medium-heat or less, wherein the one or more protein ingredients comprises TGF-β;
   b. combining the protein ingredients with one or more additional components of the liquid nutritional product to form a slurry;
   c. pasteurizing the slurry at a temperature of about 70° C. to about 75° C. for about 5 to 25 seconds;
   d. subjecting the slurry to a pressure of from about 2500 pounds per square inch (psi) to about 3500 psi at a temperature of from about 55° C. to about 65° C. for about 5 to about 20 seconds;
   e. subjecting the slurry to a temperature of from about 135° C. to about 150° C. for about 1.5 to about 15 seconds; and
   f. cooling the slurry to a temperature of less than about 8° C. in about 30 minutes or less.

2. The method according to claim 1, wherein the heat load comprises low-heat.

3. The method according to claim 1, wherein the whey protein powder has an undenatured whey protein nitrogen level of from about 6.0 mg/g to about 15 mg/g.

4. The method according to claim 1, wherein the whey protein powder has an undenatured whey protein nitrogen level of from about 10 mg/g to about 20 mg/g.

5. The method according to claim 1, wherein the whey protein powder has an undenatured whey protein nitrogen level of from about 12 mg/g and about 15 mg/g.

6. The method according to claim 1, wherein step (d) is conducted at a pressure of about 3000 psi and a temperature in the range of about 55° C. to about 65° C. for about 5 to 20 seconds.

7. The method according to claim 1, wherein step (e) is conducted at a temperature in the range of about 141° C. to about 145° C. for about 1.5 to about 15 seconds.

8. The method according to claim 1, wherein step (e) is conducted at a temperature in the range of about 141° C. to about 145° C. for about 5 seconds.

9. The method according to claim 1, additionally comprising aseptically filling the cooled slurry into a container.

* * * * *